United States Patent
Valle

(10) Patent No.: US 7,131,656 B2
(45) Date of Patent: Nov. 7, 2006

(54) SPROCKET SUPPORT MEMBER FOR A BICYCLE SPROCKET ASSEMBLY

(75) Inventor: Maurizio Valle, Vicenza (IT)

(73) Assignee: Campagnolo, S.r.l., Vicenza (IT)

( * ) Notice: Subject to any disclaimer, the term of this patent is extended or adjusted under 35 U.S.C. 154(b) by 0 days.

(21) Appl. No.: 10/616,830

(22) Filed: Jul. 10, 2003

(65) Prior Publication Data

US 2004/0070166 A1  Apr. 15, 2004

(30) Foreign Application Priority Data

Oct. 11, 2002  (EP) .................................. 02425621

(51) Int. Cl.
*B62M 1/02*  (2006.01)
(52) U.S. Cl. ..................................................... 280/260
(58) Field of Classification Search ............... 280/268, 280/260

See application file for complete search history.

(56) References Cited

U.S. PATENT DOCUMENTS

| 5,246,402 A | 9/1993 | Romano ...................... 474/78 |
| 5,782,712 A | 7/1998 | Campagnolo ............... 474/152 |
| 5,935,034 A | 8/1999 | Campagnolo ............... 474/160 |
| 6,102,821 A | 8/2000 | Nakamura ................... 474/160 |

FOREIGN PATENT DOCUMENTS

| DE | 892561 | 10/1953 |
| EP | 0510371 | 10/1992 |
| EP | 02425621 | 3/2003 |

*Primary Examiner*—Lesley D. Morris
*Assistant Examiner*—Marc A. Scharich
(74) *Attorney, Agent, or Firm*—Volpe and Koenig, P.C.

(57) ABSTRACT

A bicycle sprocket assembly having at least one subassembly including a sprocket support member and two sprockets. The support member has at least one engagement portion for coupling it to a bicycle freewheel and at least one fastening portion arranged in a radially external position with respect to the engagement portion. Both sprockets are fixed on the sprocket support member on the same side of the fastening portion.

8 Claims, 4 Drawing Sheets

FIG. 5
FIG. 6
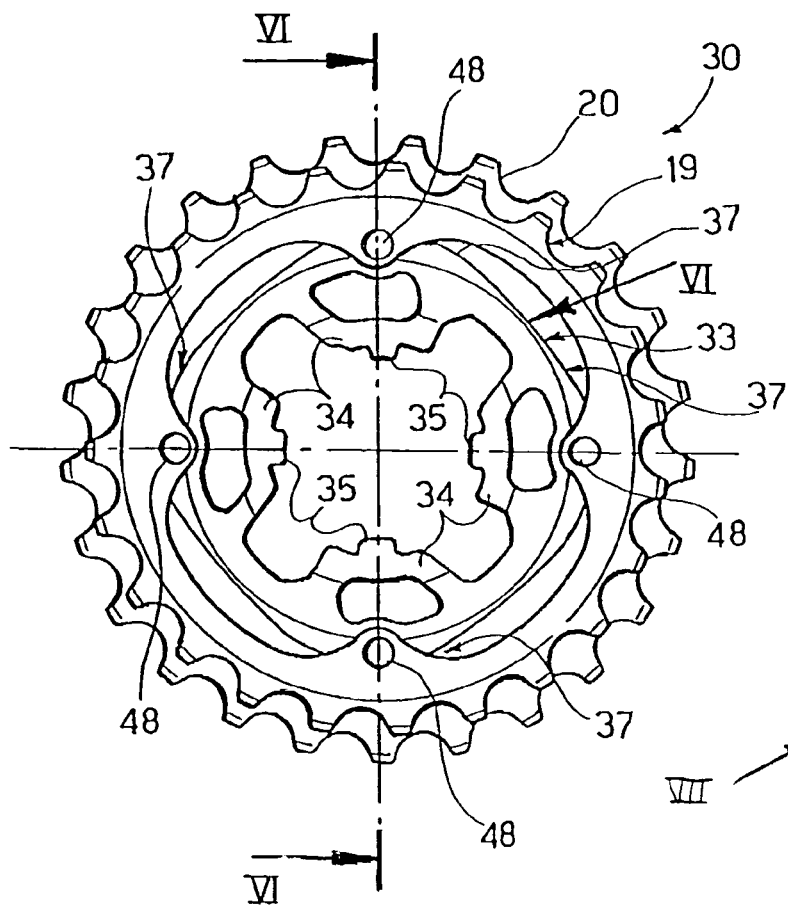
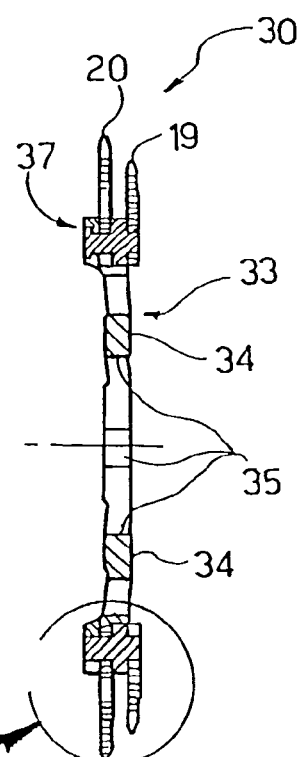
FIG. 7
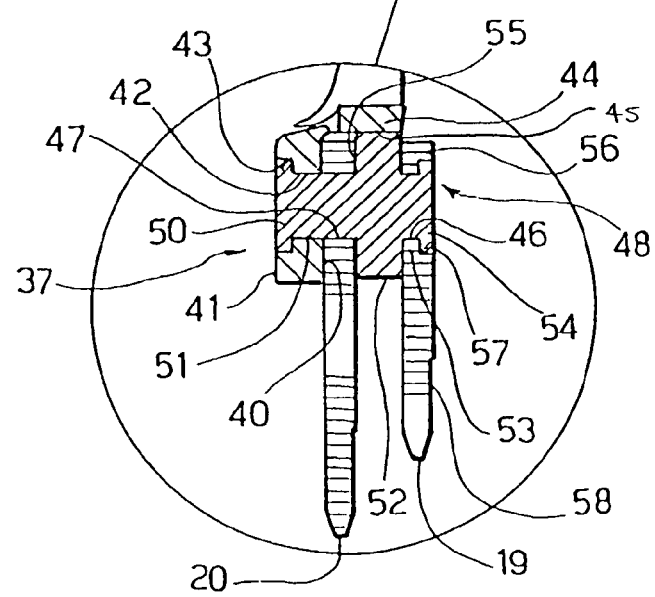

SPROCKET SUPPORT MEMBER FOR A BICYCLE SPROCKET ASSEMBLY

FIELD OF INVENTION

The present invention relates to a sprocket support member for a sprocket assembly of a bicycle rear wheel.

BACKGROUND OF THE INVENTION

Over recent years, the number of transmission ratios available on bicycle gear change devices has progressively increased and sprocket assemblies for the rear wheel of a bicycle having nine or ten sprockets are increasingly common on the market. The progressive increase in the number of sprockets requires ever increasing research for reducing the weight of the sprocket assembly. In U.S. Pat. No. 5,935,034, assigned to the same assignee as the present invention, a sprocket assembly is described that includes a support member having a radially internal portion shaped such that it couples with a freewheel device and a radially external fastener portion. Two sprockets are mounted on the opposite surfaces of the fastener portion. A third sprocket can be mounted on the support member in addition to the first two sprockets through a plurality of spacer bushings. U.S. Pat. No. 6,102,821 describes a sprocket assembly in which two sprockets are fixed on opposite sides of a sprocket support member by pins that engage with aligned holes of the sprockets and of the support member.

With the progressive increase in the number of sprockets, in addition to the need for reducing the weight of the assembly, there is also the need for arranging the sprockets in positions that are closer one to the other. As a consequence, the space available for the sprocket support member becomes more limited. On the other hand, this support member performs an important structural function and it is necessary to ensure that it has high rigidity and resistance characteristics.

SUMMARY OF THE INVENTION

The present invention addresses the prior art's shortcomings by using a sprocket support member for a bicycle sprocket assembly comprising at least one engagement portion provided with means for coupling with a bicycle freewheel and at least one fastening portion arranged in a radially external position with respect to said engagement portion. The fastening portion has at least one hole for the mounting of at least one sprocket to the sprocket support member, wherein said fastening portion is axially displaced with respect to said engagement portion.

BRIEF DESCRIPTION OF THE DRAWING(S)

The sprocket support member according to the present invention will become evident through the detailed description that follows, provided purely as a non-limiting example. In the detailed description, the following Figures are discussed.

FIG. 5 is a front elevation of a subgroup indicated by the arrow V in FIG. 1.

FIG. 6 is a cross-section along the line VI—VI in FIG. 5.

FIG. 7 is an enlarged-scale cross-section of the detail indicated by the arrow VII in FIG. 6.

DETAILED DESCRIPTION OF THE PREFERRED EMBODIMENT(S)

Figure 1:
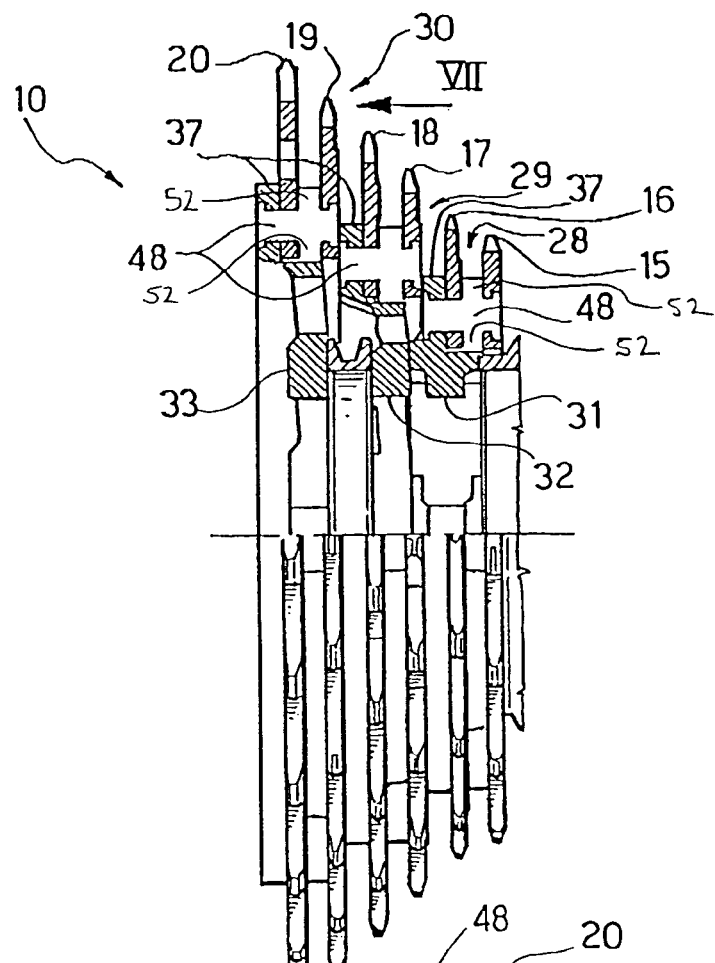
FIG. 1 is a partial cross-sectional side view of part of a sprocket assembly according to the present invention.
Figure 2:
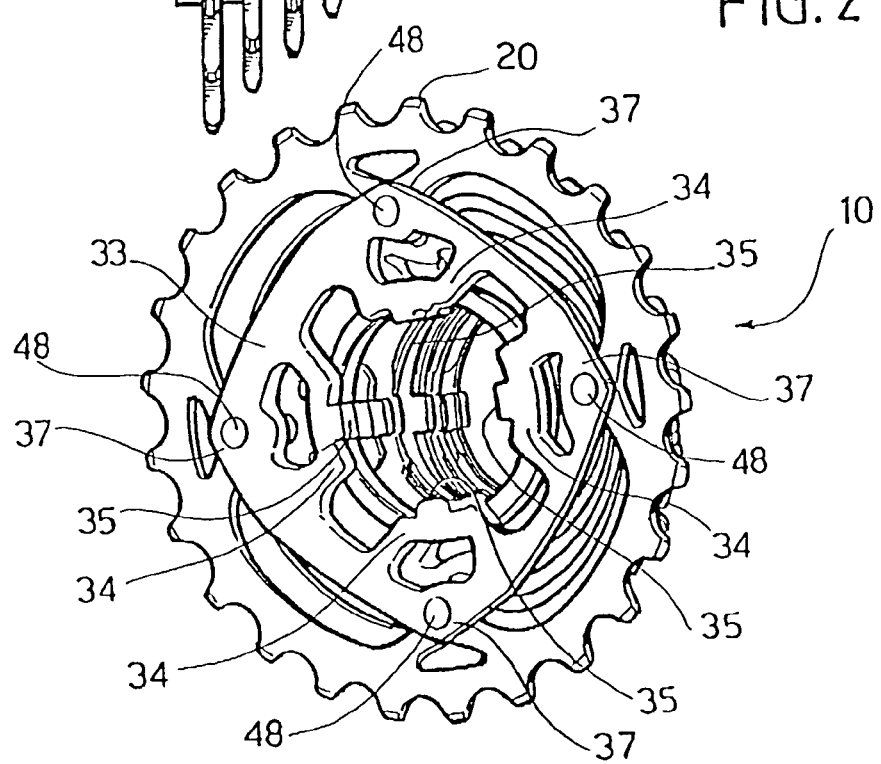
FIG. 2 is a perspective rear view of the sprocket assembly in FIG. 1.

With reference to FIG. 1, reference number 10 indicates part of a bicycle sprocket assembly that is intended for a rear or driven wheel. The sprocket assembly illustrated in FIG. 1 normally includes ten sprockets, although only six of them are shown. The sprocket assembly 10 is configured to be mounted on the hub of a freewheel device having external splines as shown in U.S. Pat. No. 5,935,034 which is incorporated herein by reference.

In the embodiment illustrated in FIG. 1, the sprocket assembly 10 comprises individual sprockets 15–20, each fitted with respective internal radial teeth 35 that directly engage with the splined surface of the hub of the freewheel device, separated from each other in the axial direction by spacer rings.

The individual sprockets 15, 16, 17, 18, 19, 20 are fixed together in pairs, 15 and 16, 17 and 18, 19 and 20 in the manner that will be described below. The sprocket pairs form three subgroups, indicated in FIGS. 1 as 28, 29 and 30. The sprockets 15–20 are connected to the sprocket support members indicated as 31, 32 and 33.

FIG. 1 shows the subgroups 28, 29 and 30 preferably mounted in mutually adjacent positions without the interposition of any spacer. The outer surface of the fastening portion of subgroup 28 rests against the outer surface of sprocket 17, belonging to subgroup 29, and the outer surface of the fastening portion of subgroup 29 rests against the outer surface of sprocket 19, belonging to subgroup 30. Thus, the fastening portions 37 of the intermediate subgroups 28 and 29 also perform the function of spacer members between adjacent subgroups and the sprockets thereon. It is important to note that the fastening portions 37, which perform the function of spacer members, are in a radially external zone close to the sprocket teeth. This permits the precision of the spacer distance between the sprockets to be significantly improved.

To perform this spacing function, the fastening portions 37 have a thickness, in the axial direction, equal to the desired distance between two adjacent sprockets. As shown in FIG. 1, the fastening portions 37 have a thickness that is preferably equal to the thickness of the radial shoulders 52 of the fastening elements 48 that perform the function of spacer elements between the two sprockets of the paired subgroup. Thus, with multiple sprockets mounted with multiple subgroups, the distance between each adjacent sprocket is the same.

Figure 3:
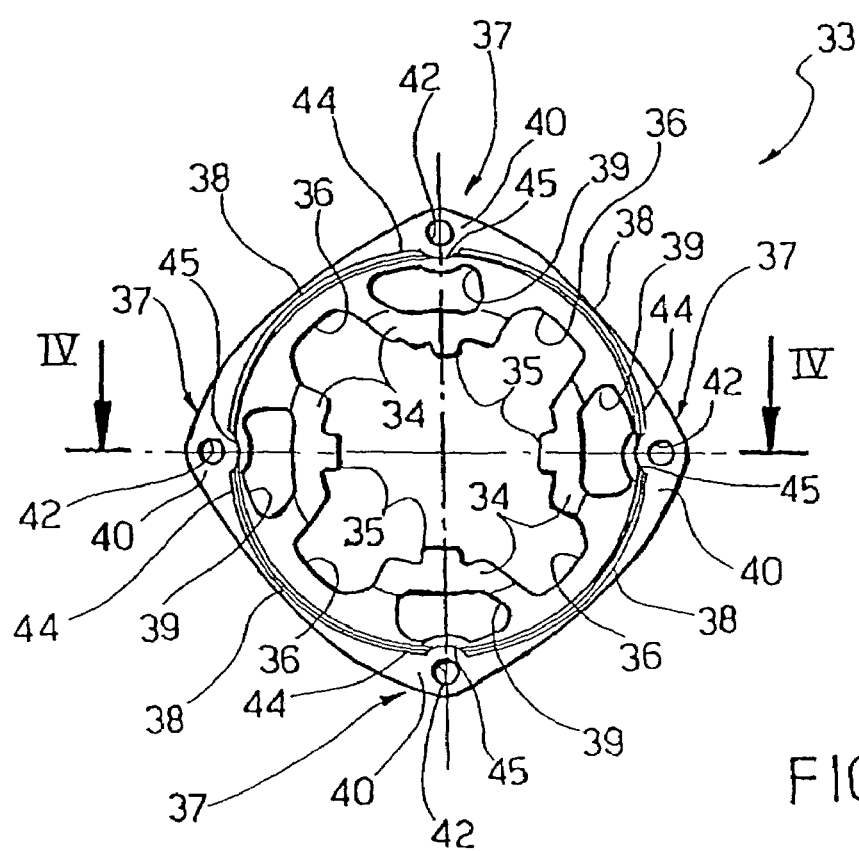
FIG. 3 is a front elevation of a sprocket support member according to the present invention.
Figure 4:
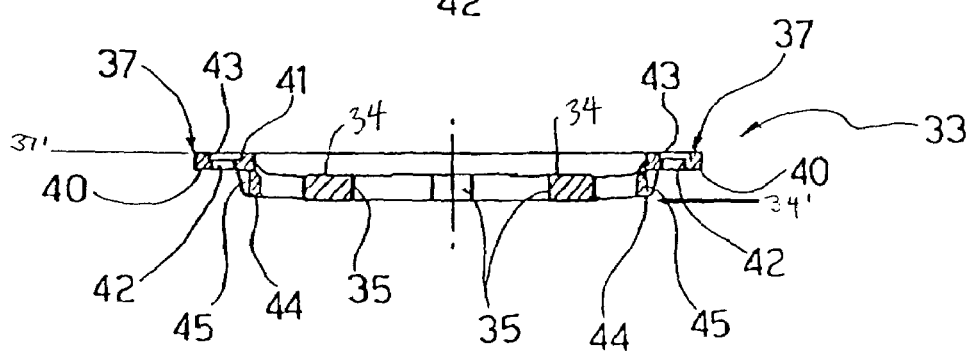
FIG. 4 is a cross-section along the line IV—IV in FIG. 3.

With reference to FIGS. 3 and 4, the sprocket support member 33 of subgroup 30 includes a plurality of engagement portions 34 each of which is constituted by an integral formation radially projecting inwardly and provided with a respective tooth 35. The teeth 35 of the engagement portions 34 are shaped so as to engage the splined surface of the hub of a freewheel device. For example, the engagement portions 34 are angularly spaced out, at 90° from each other by a weight-reducing hollow zone or recess 36 which further opens the central internal opening of the sprocket support member 33.

The sprocket support member 33 includes a plurality of fastening portions 37, arranged in radially in external positions with respect to and opposite the engagement portions 34. In the embodiment illustrated in the figures, the four fastening portions 37 are angularly spaced out at 90° from each other. Preferably the fastening portions 37 are on centerlines with the associated teeth 35. Each of these structural units is provided with an additional weight-saving cavity 39 located between the engagement portion 34 and the fastening portion 37. From the structural point of view, the sprocket support member 33 results to be formed by a series of equidistant structural units, each of which includes an engagement portion 34 and a fastening portion 37, the individual structural units being connected to each other by zones 38 of smaller radial dimensions.

The fastening portions 37 are axially displaced with respect to the engagement portions 34. More precisely, the fastening portions 37 are contained in a first plane 37' orthogonal to the rotational axis of the sprocket support member 33, and the engagement portions 34 are contained in a second plane 34' parallel to the first, see FIG. 4.

Each fastening portion 37 includes a contact surface 40 and an outer surface 41. The surfaces 40 and 41 are preferably oriented in a radial direction and are mutually parallel. Each fastening portion 37 defines a mounting through hole 42. Preferably, each mounting hole 42 includes an enlarged portion 43 where it opens onto the outer surface 41.

Each fastening portion 37 includes an axial projection 44 located at the base of the contact surface 40. The axial, generally circular projection 44 creates a step between fastening portions 37 and the generally circular engagement portions 34. In practice, the axial projection 44 is formed by an axial displacement of the fastening portions 37 with respect to the engagement portions 34. Centering and support seats 45 are formed on the axial projections 44; each seat has the shape of a cylindrical sector coaxial with the respective fastening hole 42. The seat and fastening hole 42 are aligned to receiver a fastener.

With reference to FIGS. 5 to 7, the two sprockets 19, 20 are fixed on the same side of the fastening portion 37. The sprockets 19 and 20 are provided with respective holes 46 and 47, which are mutually coaxial and coaxial with the fastening holes 42 of the fastening portions 37. The fastening of the sprockets 19, 20 on the sprocket support member 33 is made by a plurality of fastening elements 48.

With reference to FIG. 7, each fastening element 48 includes a first head 50, a first cylindrical portion 51, a radial shoulder 52, a second cylindrical portion 53 and a second head 54. The radial shoulder 52 includes two opposing, mutually parallel radial faces 55 and 56. The first head 50 of each fastening element 48 engages the enlarged hole portion 43, such that the outer surface of the head 50 is substantially flush with the outer surface 41. The first cylindrical portion 51 engages the fastening hole 42 and the hole 47 of the sprocket 20 and the second cylindrical portion 53 engages the hole 46 of the sprocket 19. The second head 54 engages an enlarged hole portion 57 such that the outer surface of the second head 54 is substantially flush with the outer surface 58 of the sprocket 19. After insertion of the cylindrical portions 51 and 53 of the fastening element 48 in the holes 42, 47 and 46, the heads 50, 54 of each fastening element 48 are deformed through riveting. The radial shoulder 52 constitutes a spacer element between the sprockets 19, 20. Part of the cylindrical surface of the radial shoulder 52 rests against the surface of the centering and support seat 45.

It will be understood that from the structural point of view that each fastening element 48 behaves like a beam resting on the hole 42 and the centering and support seat 45. The sprocket 20 is attached by four of the fastening elements 48 located as described. This allows a highly rigid connection to be achieved. Only the sprocket 19 is surface mounted on the fastening element 48. From the point of view of the connection rigidity, the solution according to the present invention is superior to those of the prior art in which the sprockets are fixed by opposite parts of the fastening portion of the sprocket support member, because in the solutions according to the prior art both of the sprockets are surface mounted.

Each sprocket subgroup 31, 32, 33, is aligned on a wheel hub (not shown) using the engagement portions 34 and teeth 35 to align the sprocket subgroups on the wheel hub. Once aligned, the subgroups are tightened to the wheel hub using a standard fastener, generally known as a quick-release.

The sprocket support member 33 can be obtained through hot or cold plastic deformation or through material removal machining and can be made of steel, aluminum and its alloys, titanium or any other metallic material with good strength, hardness, and weight characteristics. The sprocket support member 33 can also be obtained through mould reticulation of a fabric made of structural fibers incorporated in a matrix of plastic material. The fibers are preferably either carbon fibers, glass fibers, aramid fibers, boron fibers, ceramic fibers or any combination thereof.

Figure 8:
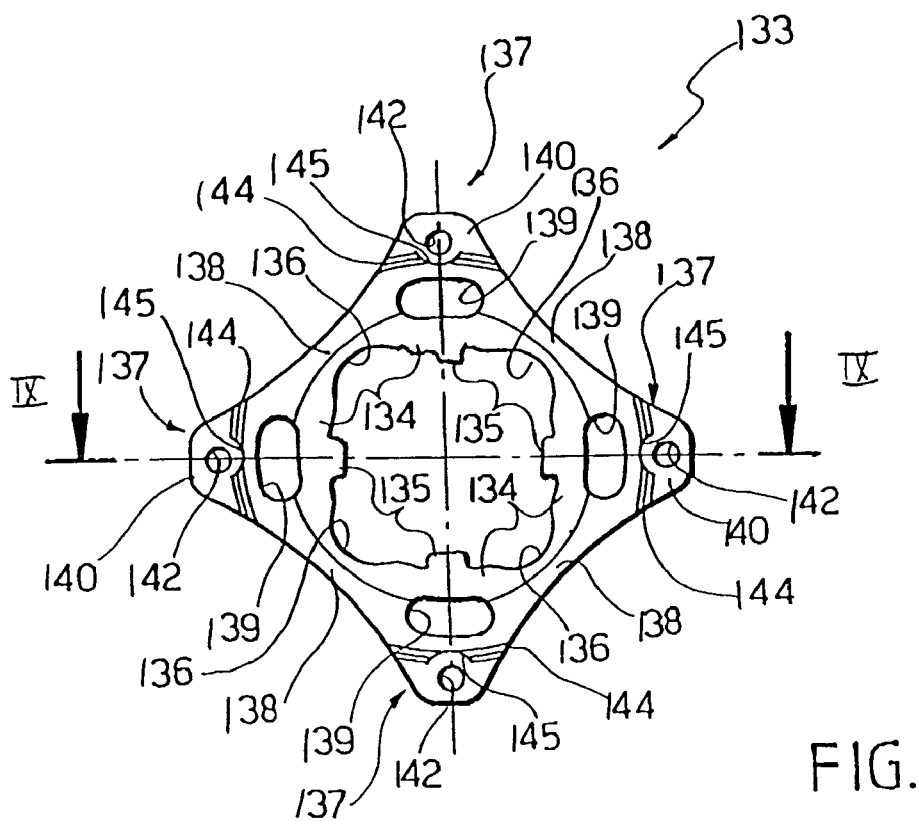
FIG. 8 is a front elevation of a second embodiment of the sprocket support member according to the invention.
Figure 9:
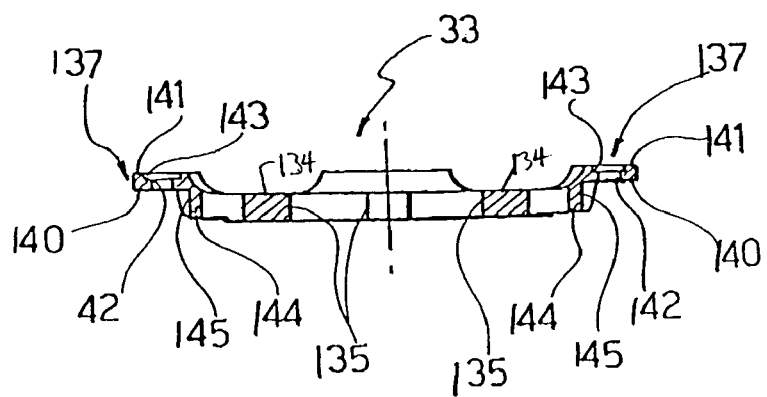
FIG. 9 is a cross-section along the arrow IX—IX in FIG. 8.

The shape of each sprocket support member 31, 32, 33 could differ from that illustrated. In a second embodiment of the sprocket support member 133 illustrated in FIGS. 8 and 9, the fastening portions 137 could be shaped like arms that extend outwards in a radial direction, with the zone of reduced radial dimension 138 having concave external borders instead of the convex ones shown in FIGS. 3 and 4. The profile of these arms could also be straight or have a more pronounced concavity or convexity with respect to those illustrated. In addition, the weight-saving hollow zones or recesses 36, 39, 136, 139 could have shapes and dimensions which are different from those illustrated so long as there is sufficient material to preserve the structural integrity of the zones 38 and 138 and the axial projections 44 and 144. These dimensions will be determined to some extent by the material and the method of production for this part.

Each fastening element 48 could be constituted by a smooth cylindrical pin with ends to be deformed in situ to form the heads 50, 54 and the radial shoulder 52 could be substituted by a ring inserted on the pin between the two sprockets 19, 20. The contact surfaces 55, 56 of the radial shoulder 52 could be divergent or convergent with respect to the axis of the fastening element 48. In addition, each sprocket support member 31, 32, 33 could carry more than two sprockets.

Further, the present invention could also be used for the front gears of a bicycle transmission assembly.

What is claimed is:

1. A sprocket support member for a bicycle sprocket assembly comprising a plurality of single structural units angularly equidistant from each other and connected together by zones having reduced dimensions in the radial direction and at least one freewheel hub engagement portion having at least one tooth engagable with a splined surface of a bicycle freewheel hub and at least one fastening portion having at least one hole for the mounting of the sprocket support member wherein the fastening portion is defined within a first plane and the engagement portion is defined in a second plane and the first plane is axially displaced with respect to the second plane and the planes are parallel to each other wherein one of the at least one fastening portion and one of the at least one engagement portion form at least one single structural unit, the one of the at least one engagement portion being aligned with the one of the at least one fastening portion in a radial direction.

2. The sprocket support member of claim 1, including an axial projection located between the engagement portion and the fastening portion.

3. The sprocket support member of claim 2, wherein the axial projection forms a support against which a radially projecting portion of a fastening element can rest.

4. The sprocket support member of claim 3, wherein the axial projection has a centering and support seat having the shape of a cylindrical sector coaxial with a fastening hole of the fastening portion.

5. The sprocket support member of claim 3, wherein the axial projection is located at the base of a radial contact surface of the fastening portion.

6. The sprocket support member of claim 1, wherein the fastening portion has an axial thickness substantially equal to a desired axial distance between multiple sprockets of the sprocket assembly.

7. The sprocket support member of claim 1, wherein the structural unit includes at least one weight-saving cavity located between the engagement portion and the fastening portion.

8. The sprocket support member of claim 1, wherein the support member is made of a material chosen among the group consisting of: steel, aluminum and its alloys, titanium, and fabric made of structural fibers incorporated in a matrix of plastic material, in which the fibers are chosen among carbon fibers, glass fibers, aramid fibers, boron fibers, ceramic fibers or any combination thereof.

* * * * *